United States Patent [19]

Greve

[11] 4,284,996
[45] Aug. 18, 1981

[54] DRIVING INK JET RECORDING ELEMENTS

[75] Inventor: Helmut Greve, Neumuenster, Fed. Rep. of Germany

[73] Assignee: Dr.-Ing Rudolf Hell GmbH, Kiel, Fed. Rep. of Germany

[21] Appl. No.: 62,001

[22] Filed: Jul. 30, 1979

[30] Foreign Application Priority Data

Aug. 11, 1978 [DE] Fed. Rep. of Germany ....... 2835262

[51] Int. Cl.³ ............................................ G01D 15/18
[52] U.S. Cl. .................................. 346/140 R; 346/1.1; 310/317
[58] Field of Search ................ 346/140 R, 1; 310/317

[56] References Cited

U.S. PATENT DOCUMENTS

| 4,126,867 | 11/1978 | Stevenson, Jr. ..................... 310/317 |
| 4,158,847 | 6/1979 | Heinzl et al. ..................... 346/140 R |
| 4,161,670 | 7/1979 | Kern ............................. 346/140 R X |

Primary Examiner—George H. Miller, Jr.
Attorney, Agent, or Firm—Brisebois & Kruger

[57] ABSTRACT

A method for driving an ink jet comprising a compression chamber for the ink, the volume of which is charged by means of a piezo-electric transducer by expanding the chamber in preparation for printing, contracting the chamber to print, and expanding the chamber again in preparation for another cycle of printing.

7 Claims, 6 Drawing Figures

DRIVING INK JET RECORDING ELEMENTS

BACKGROUND OF THE INVENTION

The present invention relates to methods of driving an ink jet recording element of the kind comprising a compression chamber for containing the ink, and in which the volume of the compression chamber is altered by means of a piezo-electric transducer to which a control voltage can be applied and wherein the compression chamber will expand if a control voltage is applied in the direction of the polarisation voltage of the transducer and will contract if a control voltage is applied in the opposite direction. The invention also extends to a circuit arrangement for carrying out the method according to the invention.

The ink jet recording element is used, for example, in printers, teletype machines, facsimile machines and similar devices.

Such an ink jet recording element consists basically of a tubular compression chamber the end of which that is directed towards a recording medium is constructed as writing nozzle and the opposite end of which is joined to a storage container for the ink. The compression chamberis enclosed by a piezo-electric transducer which alters the volume of the compression chamber in synchronism with a control voltage, utilizing the piezo-electric effect.

During a writing phase the compression chamber contracts and the pressure wave arising in this manner propels one of several droplets of ink out of the writing nozzle.

During a subsequent regeneration phase the compression chamber expands and replenishes the amount of ink, reduced due to the formation of the droplets, from the storage container.

The requirement is for a short writing time and a good-quality reproduction. These requirements can be met by a high and constant speed of emission of the droplets of ink from the ink nozzle, by a short-interval and constant sequence of droplets and by a constant droplet volume.

From German Offenlegungsschrift No. 21 44 892 different types of control voltage generators for a piezo-electric transducer are known already in which the control voltage pulses are generated by charging and discharging the piezo-electric transducer, which acts electrically as a "capacitor" via resistors and inductors.

In these control voltage generators the minimum achievable pulse duration is limited with RC circuits by their time constants or with LC circuits by their resonance behaviour. The frequency of the droplet sequence cannot, therefore, be increased at will and the limit of working speed has been reached.

The step rise and exponential decay of the control pulses causes the transitions from volume constriction to volume expansion to be not continuous, leading to the recording element behaving in an uncontrollable manner.

In practice it has also become apparent that drives of these types have a tendency to produce spurious oscillations in the liquid. A mutual interaction of the ink droplets takes place which produces, according to the phase relationship of the spurious oscillations at the time when droplets are being formed, shorter or longer intervals between droplets. In order to keep the effects of such spurious oscillations in the liquid to a low level, certain settling periods for the spurious oscillations have to be included into the calculations for the customary control voltage generators which also sets limits to an increase in the frequency of the droplet sequence.

In addition, the known types of drive do not work stably, producing voltage pulses containing different amounts of energy, and thus droplets of different volume. If the voltage pulses are too small no droplets at all will be emitted from the writing nozzle and if the voltage pulses are too big, on the other hand, there can be spurious oscillations and so-called satellite droplets.

However, a non-uniform droplet sequence and varying droplet volumes have a considerable influence on the quality of the reproduction.

A further disadvantage consists in that, depending on the steepness of the voltage pulses, a high dynamic pulse power must be transmitted which is retained statically after switching has occurred or which decays exponentially.

In German Offenlegungsschrift No. 25 48 691 another drive system for a piezo-electric transducer is described in which the control voltage pulses are applied to the transducer by means of a pulse transformer.

In this case, too, the attainable pulse duration and thus also the attainable droplet repetition rate is limited by the behaviour of the resonant circuit formed from the inductance of the pulse transformer and the capacity of the transducer.

In German Offenlegungsschrift No. 24 05 584 it is suggested to prevent uncontrollable spurious oscillations by means of a special construction of the compression chamber and of the throttling device and by using suitable materials, so that the droplet frequency can be increased. These measures, however, are very expensive. It had not been recognized here that the existing problems have to be solved by driving the piezo-electric transducer in a suitable manner.

It is an object of the invention to lay down a method and a circuit arrangement for driving an ink jet recording element comprising a compression chamber for the ink, operated by a piezo-electric transducer, by means of which the said disadvantages are eliminated and a high and constant droplet emission speed and droplet frequency and a constant droplet volume are achieved. These measures permit the working speed and quality of reproduction of ink jet recording devices to be improved considerably.

SUMMARY OF THE INVENTION

Accordingly, in a method for driving an ink jet recording element of the kind comprising a compression chamber for containing the ink, and in which the volume of the compression chamber is altered by means of a piezo-electric transducer to which a control voltage can be applied and wherein the compression chamber will expand if a control voltage is applied in the direction of the polarisation voltage of the transducer and will contract if a control voltage is applied in the opposite direction, the invention firstly consists in that the piezo-electric transducer has applied to it during a write phase for constricting the compression chamber past a static condition in a first defined time interval a current source, the current of which generates the opposing control voltage, and during a subsequent regeneration phase for expanding said compression chamber in a second defined time interval another current source of opposite polarity, the current of which is arranged to generate the control voltage, the duration of the individual phases being forced by the time intervals und the volume change of the transducer in the individual phases being forced by the current curve.

Secondly, the invention also consists in an arrangement for carrying out the method hereinabove set forth, comprising a piezo-electric transducer to which control currents are applicable, a first current source, which can be switched on and off, for generating a control current, a second current source, connected to said first current source, and of opposite polarity for generating an opposing control current, the one electrode of said piezo-electric transducer being connected to ground potential and the other electrode of said piezo-electric transducer being connected to said current sources and therein switching means are provided for switching said current sources on and off.

In order that the invention may be more clearly understood, reference will now be made to the accompanying drawings which show certain embodiments thereof by way of example and in which:

FIG. 1 shows the construction principle of an ink jet recording element with a control voltage generator, FIG. 2 shows a pulse diagram, FIG. 3 shows an illustrative embodiment of a signal generator, FIg. 4 shows a further pulse diagram, FIG. 5 shows a first illustrative embodiment of a control voltage generator and, FIG. 6 shows a second illustrative embodiment of a control voltage generator.

DETAILED DESCRIPTION OF PREFERRED EMBODIMENT

Figure 1:
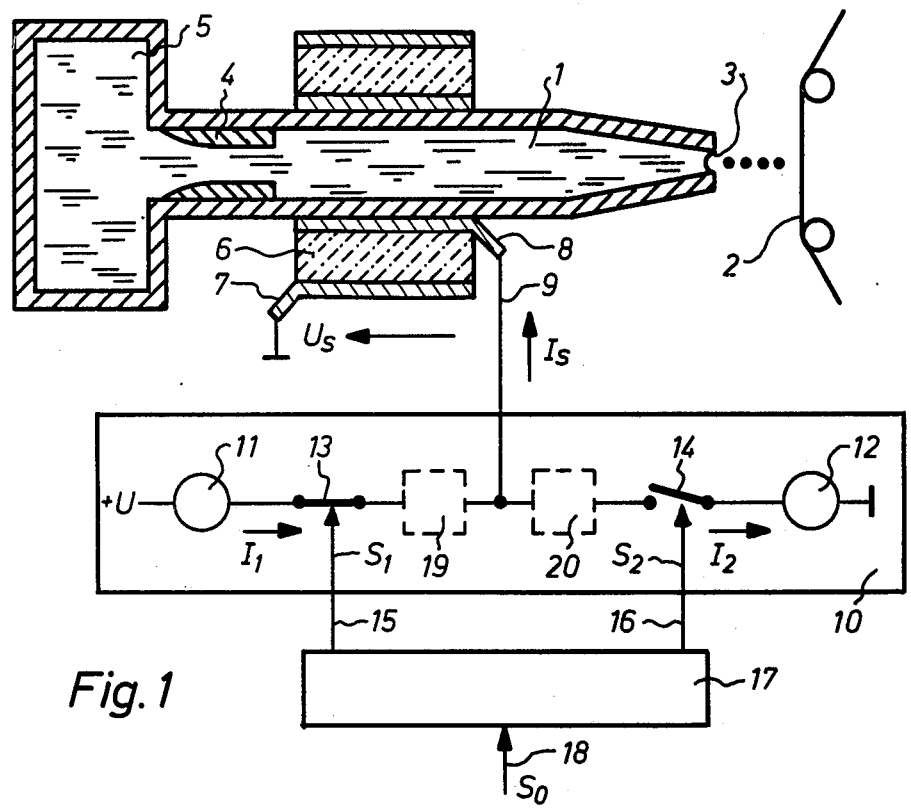

Referring now to the drawings, the ink jet recording element consists of a tubular, resilient compression chamber 1 of glass or plastic. That end of the compression chamber 1 directed towards a recording medium 2 is constructed as writing nozzle 3. The other end is joined via a throttling device 4 to a storage container 5 for the ink. The compression chamber 1 is enclosed by a piezo-electric transducer 6 in the shape of a hollow cylinder (toroid) which, utilizing the piezo-electric effect, constricts or expands the volume of the compression chamber 1 in synchronism with a control voltage $U_s$.

During a static condition of rest, during which there is a slight amount of negative pressure in the writing nozzle 3, a concave meniscus of ink is formed at the nozzle outlet and no ink will leave the writing nozzle 3. The static rest condition is set by a bias voltage $U_{sv}$. Only when the piezo-electric transducer 6 is driven appropriately will the pressure wave spreading out in the compression chamber 1 force a wedge of ink out of the writing nozzle 3. The wedge of ink will split up into one or several droplets of ink which contact the recording medium 2 and generate the printing dots.

The advantage of such a low-pressure system consists in that the recording element can be switched on and off by the electric drive system.

No advance systems generating the relative movement between ink jet recording element and recording medium required for area recording are shown since they are known and are not per se a subject of the Application.

In the illustrative embodiment the piezo-electric transducer consists of a radially polarized piezo ceramic device, for example of type PXE made by Valvo GmbH.

Such piezo-electric transducers are described in the handbook "Piezoxide Transducers" by Messrs. Valvo GmbH, published by Boysen & Maasch, Hamburg, ISBN 3/87095/215/6, so that no detailed explanations are necessary at this place The inner and outer surface of the jacket of the hollow piezo-electric cylinder have vapour-deposited on them metal layers as electrodes 7 and 8 for the purpose of building up an electric field. Electrically, the provision of contacts makes the piezo-electric ceramic body behave like a capacitor with a relatively high capacity of approximately 1.2 nF. The electrode 7 is at earth potential and the electrode 8 has applied to it the control voltage $U_s$ which appears on a line 9 as a consequence of a control current $I_s$.

Such compression chambers can, of course, also be operated with axially polarized piezo-ceramic elements.

The control current $I_s$ is formed in a generator circuit 10 from two constant currents $I_1$ and $I_2$ of different polarities which are generated in two constant current sources 11 and 12. The constant current sources 11 and 12 can be switched on and off by suitable switching means, symbolized in the illustrative embodiment by two mechanical switches 13 and 14.

The switches 13 and 14 can be controlled by digital switching signals $S_1$ and $S_2$ on lines 15 and 16 which are derived in a signal generator 17 from a write instruction $S_o$ on a line 18.

It is preferable for the constant currents $I_1$ and $I_2$ to be quantitatively identical. However, currents of optional magnitudes can also be used. in order to match the current characteristics to the properties of the fluid and of the ink jet recording element the currents $I_1$ and $I_2$ can be pre-equalized differently by means of equalizing stage 19 and 20, thus forcing an equalized control current $I_s$.

Each write instruction $S_o$ on the line 18 initiates a write cycle for droplet formation, consisting of three consecutive independent phases of specified time intervals, these being a preparation phase (I), a write phase (II) and a regeneration phase (III).

Figure 2:
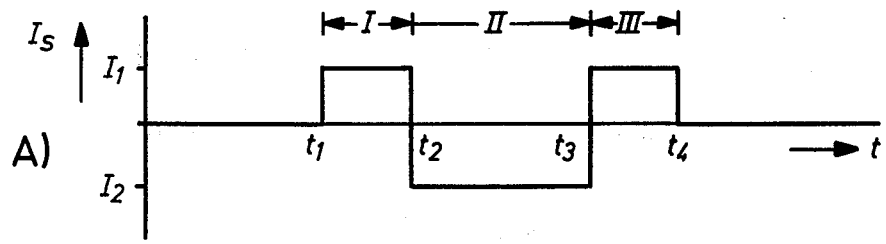
Figure 2:
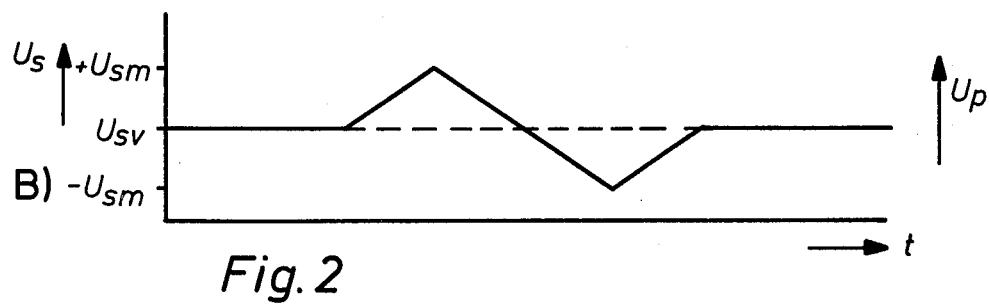

The curve of the control current $I_s$ forced by the digital switching signals $s_1$ and $S_2$ is entered in diagram A) of FIG. 2. The preparation phase (I) is marked by the time interval $t_1-t_2$, the write phase (II) by the time interval $t_2-t_3$ and the regeneration phase (III) by the time interval $T_3-t_4$. The associated curve of the control voltage $U_s$ at the electrode 8 of the piezo-electric transducer 6 can be seen in diagram B) of FIG. 2.

With a control voltage $U_s$ in the direction of the polarizing voltage $U_p$ of the piezo-ceramic element the volume of the compression chamber 1 will increase and with a corresponding control voltage of the opposite polarity it will decrease.

The curve of the control voltage $U_s$ corresponds to the characteristic according to which also the change in volume of the compression chamber 1 takes place.

The static condition of the compression chamber 1 is defined by a bias voltage $U_{sv}$ and by a control current $I_s=0$. The voltage swing between the maximum and minimum control voltage $U_{sm}$ is symmetrical with respect to the bias voltage $U_{sv}$.

The individual events are explained in greater detail with the aid of FIG. 2 in the description which follows.

During the preparation phase (I) in time interval $t_1-t_2$ the first constant current source 11 is switched on by the signal $S_1$, the constant control current $I_s=I_1$ flows and the control voltage $U_s$ rises in the direction of the polarisation voltage $U_p$ from the bias voltage level $U_{sv}$ up to the maximum value $U_{sm}$.

This causes the compression chamber 1 to expand past its static condition immediately before the write phase, so that ink flows again from the storage container 5 into the compression chamber 1.

The preparation phase advantageously increases the emission speed of the ink droplets from the writing nozzle 3 and thus the working speed of the ink jet recording device.

During the subsequent write phase (II) in the time interval $t_2$14 $r_3$ the second constant current source 12 is switched on by the switching signal $S_2$ and the first constant current source 11 is switched off by the switching signal $S_1$ so that now the constant control current $I_s = -I_2 = -I_1$ if flowing and the control voltage $U_s$ drops linearly in opposition to the polarisation voltage $U_p$ down to its minimum value.

The compression chamber contracts past its static condition. The excess pressure in the compression chamber causes the meniscus of ink at the opening of the nozzle to arch outward and a wedge of ink is emitted which splits up into one or several droplets of ink.

The swing of the control voltage $U_s$ in the write phase determines the volume of the droplet of ink. Since the generator circuit 10 works in a stable manner the volume of the individual droplets of ink is also constant, resulting in the generation of a uniform sequence of droplets.

The write phase is followed by the regeneration phase (III) in the time interval $t_3$-$t_4$. During the regeneration phase the first constant current source 12 is again switched on by the switching signal $S_1$ and the second constant current source 12 is switched off by the switching signal $S_2$, the constant control current $I_s = I_1$ flows and the control voltage $U_s$ rises linearly from its minimum value up to the bias voltage $U_{sv}$ in the direction of the polarisation voltage $U_p$.

The compression chamber 1 expands to its static condition and the amount of ink lost due to the formation of droplets of ink during the write phase is replenished from the storage container 5.

The exactly controlled reversal of the control voltage $U_s$ at time $t_3$ advantageously achieves that the emission of ink is discontinued purposively at the opening of the writing nozzle 3 and thus the creation of spurious oscillations is avoided.

At the same time any excessive ink is sucked back from the nozzle opening into the writing nozzle 3 until a concave meniscus of ink has formed again, by which means the writing nozzle 3 can be made to clean itself.

At time $t_4$ one write cycle ($t_1$-$t_4$) is complete and a new write cycle can be initiated immediately thereafter. In this way a high repetition frequency can be achieved since no settling time is required because there are no spurious oscillations.

With the specified drive for the piezo-electric transducer the time interval for each individual phase can be determined exactly individually and independently of the other phases by switching the current sources on and off in a specified manner and the desired characteristic of volume change for the compression chamber 1 can be forced continuously by means of the control voltage curve.

Thus each phase can be matched optimally according to its duration and characteristic to the conditions of flow predetermined by the construction of the recording element and to the properties of the fluid in a preferred manner.

The volume of droplets can be metered more exactly by means of the swing of the control voltage $U_s$ in the write phase (II).

In addition the energy of the pulses increases in a constant manner in the individual phases so that overall the required supply of energy is less.

As will still be shown, the generator circuit 10 is designed in such a manner that the current and voltage curves are largely independent of variations in temperature and operating voltage and are thus stable, resulting in a great accuracy in the repeatability of the sequence of droplets, of the shape of the droplets, of the volume of the droplets and of the emission angle of the droplets from the writing nozzle 3.

In FIG. 1 an ink jet recording element is shown with only one compression chamber 1 and one writing nozzle 3. So-called matrix or mosaic recording devices have a plurality of such compression chambers and writing nozzles which can be driven separately. In this case, too, the specified current control can be used preferably for the individual piezo-electric transducers.

With high-pressure recording devices the recording element generates a continuous sequence of ink droplets. The ink droplets are charged electrically in dependence on a character generator and are directed, depending on their charge, in an electric DC field either toward the recording medium or toward an ink pool. The continuous sequence of droplets is generated either, as described, by altering the volume of a compression chamber or by mechanically vibrating the writing nozzle by means of a piezo-electric transducer.

It is within the scope of the invention to use the current control specified also for this. Since the formation of droplets must be synchronized with the character generator the high constancy of the sequence of droplets and of the volume of droplets is extremely advantageous.

Figure 3:
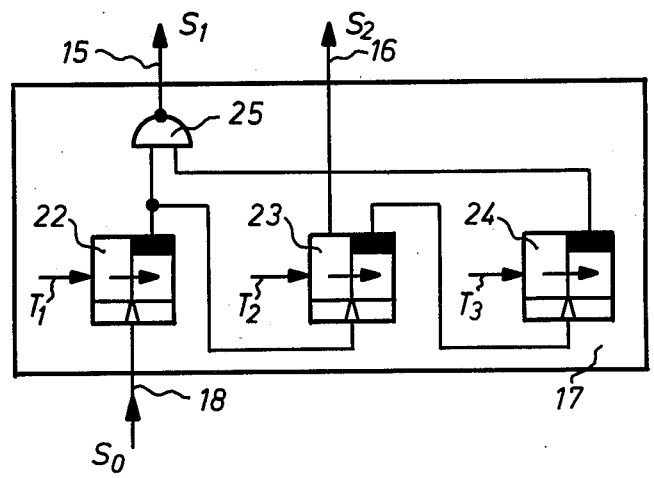

FIG. 3 shows an illustrative embodiment for the signal generator for generating the digital switching signal $S_1$ and $S_2$.

Essentially, the signal generator 17 consists of three delay stages 22, 23 and 24 in the form of monostable multivibrators, following one another, the delay periods $T_1$, $T_2$ and $T_3$ of which can be adjusted.

The write instruction $S_o$ is applied to the first delay stage 22 via line 18. The output signals of the delay stages 22 and 24 are linked logically via a NAND gate 25 at the output of which the digital switching signal $S_1$ appears on line 15. The output signal of the delay stage 23 corresponds to the digital switching signal $S_2$ on the line 16.

Figure 4:
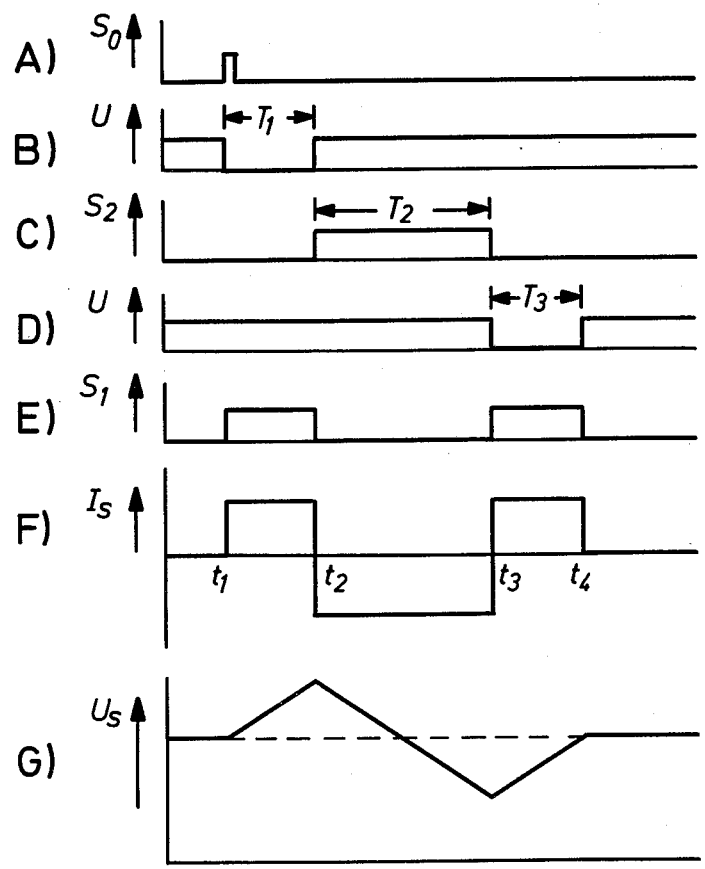

The operation of the signal generator 17 is explained with reference to FIG. 4.

At (A) the write instruction $S_o$, at (B) the output signal of the delay stage 22, at (C) the switching signal $S_2$, at (D) the output signal of the delay stage 24 and at (E) the switching signal $S_1$ is shown. The curves of control current $I_s$ and of control voltage $U_s$ shown at (F) and (G) are identical to the curves shown in FIG. 2.

The write cycle ($t_1$-$t_4$) in initiated by the write instruction $S_o$ which triggers the delay stage 22. After the delay period $T_1$ has elapsed the delay stage 22 triggers the delay stage 23 which, in turn, after the delay period $T_2$ has elapsed triggers the delay stage 24. After the delay period $T_3$ has elapsed the output signal appears at the delay stage 24.

The delay period $T_1$ determines the duration of the preparation phase (I), the delay period $T_2$ the duration of the write phase (II) and the delay period $T_3$ the duration of the regeneration phase (III).

If the currents $I_1$ and $I_2$ are quantitatively identical $T_1$ is selected to be $=T_3$ and $T_2=T_1+T_3$. With differing currents $I_1$ and $I_2$ the delay periods are altered correspondingly so that at the end of the write cycle the initial state of the control voltage $U_2$ at the piezo-electric transducer 6 is reached again.

Figure 5:
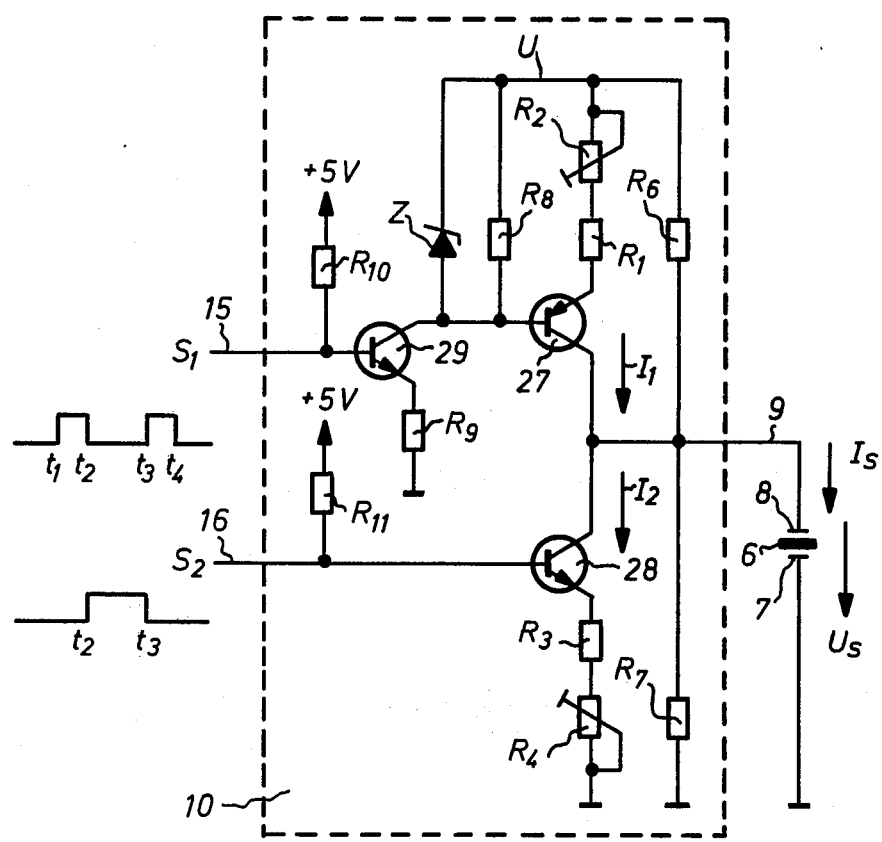

FIG. 5 shows an illustrative embodiment of the generator circuit 10. The first constant current source is formed from transistor 27, a resistor $R_1$ and a potentiometer $R_2$. The second constant current source consists of a transistor 28, a resistor $R_3$ and a potentiometer $R_4$.

The currents $I_1$ and $I_2$ are set by the potentiometers $R_2$ and $R_4$. The collectors of the transistors 27 and 28 are joined to each other and via line 9 to the electrode 8 of the piezo-electric transducer 6 the electrode 7 of which is at earth potential. The control current $I_s$ on line 9 is composed of the currents $I_1$ and $I_2$.

The bias voltage $U_{sv}$ for maintaining the static condition in the piezo-electric transducer 6 is taken off a voltage divider $R_6$; $R_7$.

If the bias voltage $U_{sv}$ is to be zero piezo-electric transducer 6 is connected to the voltage divider $R_6$ and $R_7$ via a capacitor and a high-valued resistance to earth earth potential.

The transistor 27 of the constant current source 11 is controlled by a switching transistor 29 to the base of which the switching signal $S_1$ on line 15 is applied.

The transistor 28 of the constant current source 12 is driven directly by the switching signal $S_2$ on line 16.

If the digital switching signal $S_1$ is at the L level the switching transistor 29 is disabled, the transistor 27 is conducting and the current $I_1$ is flowing. If the digital switching signal $S_2$ assumes the H level the transistor 28 is conducting and the current $I_2=-I_1$ is flowing.

The relationship between the digital switching signals $S_1$ and $S_2$ and the control current $I_s$ can be seen from the pulse diagrams drawn in FIG. 5.

Figure 6:
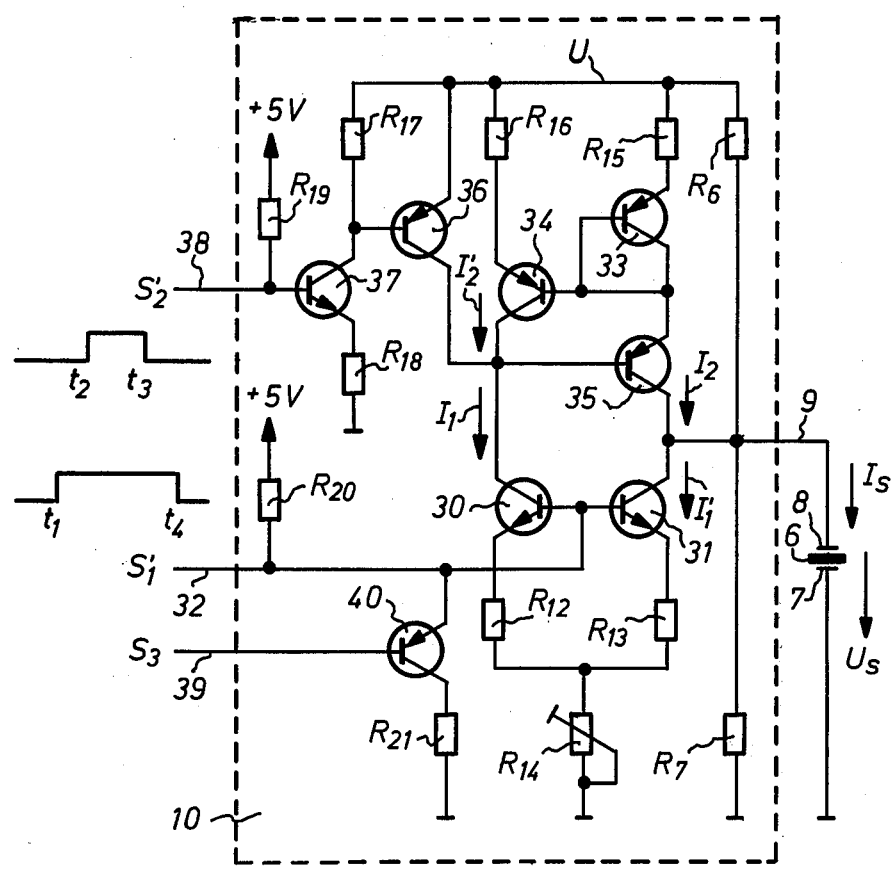

FIG. 6 shows another illustrative embodiment of a generator circuit 10 which is built up from four constant current sources.

The first constant current source which generates the current $I_1$ consists of a transistor 30 and a resistor $R_{12}$; the second constant current source for the current $I'_1$ consists of a transistor 31 and a resistor $R_{13}$. The resistors $R_{12}$ and $R_{13}$ are identical so that the currents $I_1$ and $I'_1$ are of the same magnitude and can be changed uniformly in their amounts by means of a common potentiometer $R_{14}$.

The constant current sources are controlled by a digital switching signal $S'_1$ on a line 32 in such a manner that they are switched on by an H level during a whole write cycle ($t_1$-$t_4$).

The third constant current source for the current $I_2$ is formed from a transistor 33 with resistor $R_{15}$ and the fourth constant current source for the current $I'_2$ by a transistor 34 with resistor $R_{16}$. Since the resistor $R_{15}$ is half the size of resistor $R_{16}$ the current $I'_2=\frac{1}{2}I_2$ flows through the transistor 34.

Combining the transistor 34 with a transistor 35 ensures that the currents $I_1$ and $I'_2$ are always identical. The third and fourth constant current source is controlled by means of the transistor 36 and 37 by a digital switching signal $S'_2$ on a line 38.

When the switching signal $S_2$ is at L potential in the preparation phase (I) and in the regeneration phase (III) the transistors 33 and 35 are conducting, current $I'_2$ is flowing and the control current $I_s$ for the piezo-electric transducer 6 is $I_s=I_2$. When the switching signal $S_2$ is at H potential in the write phase (II) the transistors 33 and 35 are disabled and the current $I_2=0$. The control current $I_s$ is now $I_s=-I'_1$.

The advantage of the specified generator circuit lies in that the swing of the control voltage $U_s$ for the piezo-electric transducer 6 can be changed symmetrically with respect to the bias voltage $U_{sv}$ by means of the potentiometer $R_{14}$ and in this way the volume of the individual droplets of ink becomes adjustable.

The volume control is used for matching the requirements of the reproduction or in preferred manner for recording gray shades (different dot sizes on the recording medium).

In the case of a gray-shade recording the required currents $I_1$ and $I'_1$ are adjusted by an analog signal $S_3$ on a line 39 which acts via a transistor 40 on the base voltage at transistors 30 and 31.

I claim:

1. In a method for driving an ink jet recording element of the kind comprising a compression chamber for containing the ink, and in which the volume of the compression chamber is altered by means of a piezoelectric transducer to which a control voltage can be applied and wherein the compression chamber will expand if a control voltage is applied in the direction of the polarisation voltage of the transducer and will contract if a control voltage is applied in the opposite direction, the method comprising the steps of (a) during a preparation phase, in a first defined time interval, applying to the piezo-electric transducer a control voltage in the polarisation direction to expand the compression chamber past its static condition, (b) during a write phase in a second defined time interval immediately following the first time interval, applying to the piezo-electric transducer a control voltage in said opposite direction to constrict the compression chamber past said static condition, and (c) during a subsequent regeneration stage in a third defined time interval immediately following said second time interval, applying to said transducer a control voltage in said polarising direction to again expand the compression chamber past its static condition, the currents of said voltages forcing said expansion and constriction during said phases and time intervals.

2. A method according to claim 1, wherein said control voltages applied during the individual time intervals are applied from current sources which generate constant currents.

3. A method according to claim 1, wherein said currents are quantitatively identical.

4. A method according to claim 1, wherein said currents in said individual time intervals are distorted.

5. A method according to claim 1, wherein said second time interval is identical to the sum of said second and third time intervals.

6. A method according to claim 1, wherein said voltages are applied from current sources which are switched on and off by switching signals and said switching signals are derived by adjustable time delays from a write instruction for the formation of droplets, said individual time intervals being determined by corresponding time delays.

7. A method according to claim 1, wherein control currents for said piezo-electric transducer for recording gray shades are altered in dependence on an image signal so that differing droplet volumes are achieved.

* * * * *